United States Patent [19]

Bywalez et al.

[11] Patent Number: 5,763,772
[45] Date of Patent: Jun. 9, 1998

[54] PROCESS FOR DETERMINING THE INITIAL STRESS OF ANTIFRICTION BEARINGS WHICH ARE PRELOADED AGAINST EACH OTHER OR INSTALLED WITH AN INITIAL STRESS

[75] Inventors: Karl Bywalez, Schweinfurt; Roland Langer, Schwanfeld, both of Germany

[73] Assignee: FAG Automobiltechnik AG, Germany

[21] Appl. No.: 678,154

[22] Filed: Jul. 11, 1996

[30] Foreign Application Priority Data

Jul. 13, 1995 [DE] Germany .................. 195 25 532.1

[51] Int. Cl.⁶ ............................................... G01M 19/00
[52] U.S. Cl. ................................... 73/118.1; 73/788
[58] Field of Search ........................ 73/788, 789, 796, 73/794, 818, 118.1

[56] References Cited

U.S. PATENT DOCUMENTS

| | | | |
|---|---|---|---|
| 5,072,611 | 12/1991 | Budd et al. ............... | 73/118.1 |
| 5,115,558 | 5/1992 | Bernhardt et al. ......... | 73/118.1 |
| 5,159,830 | 11/1992 | Inoune et al. ............ | 73/118.1 |
| 5,490,732 | 2/1996 | Hoffman et al. .......... | 384/537 |

*Primary Examiner*—Richard Chilcot
*Assistant Examiner*—Max H. Noori
*Attorney, Agent, or Firm*—Ostrolenk, Faber, Gerb & Soffen LLP

[57] ABSTRACT

A process for determining the prestress of antifriction bearings which are preloaded against each other or installed with an initial stress, and permitting a reliable determination as to the prestress actually present in the bearing. The initial stress is determined in connection with the elastic behavior (elastic deformation) of the bearing, by first, applying a first force $F_1$ to the bearing as it rests on a flange or bearing ring, and measuring the elastic deformation $S_1$ resulting therefrom. Second, another (higher) force $F_2$ is applied to the bearing and again the elastic deformation $S_2$ resulting therefrom is measured. Thereupon, the difference between the elastic deformations ($S_2-S_1=\Delta S$) is determined and the existing initial stress is found by comparison with the elastic characteristic (calculated or empirically determined) of the bearing.

8 Claims, 3 Drawing Sheets

FIG. 1
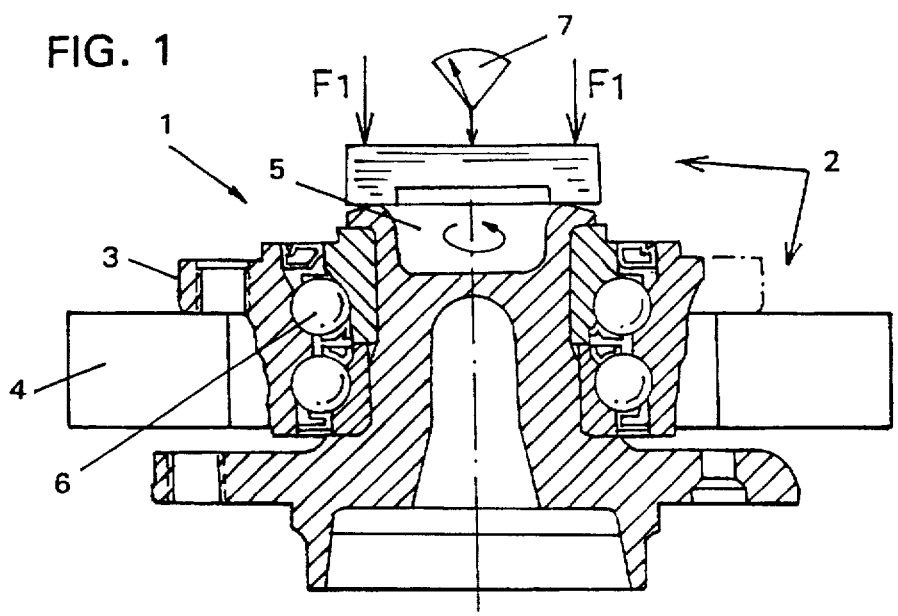
FIG. 2
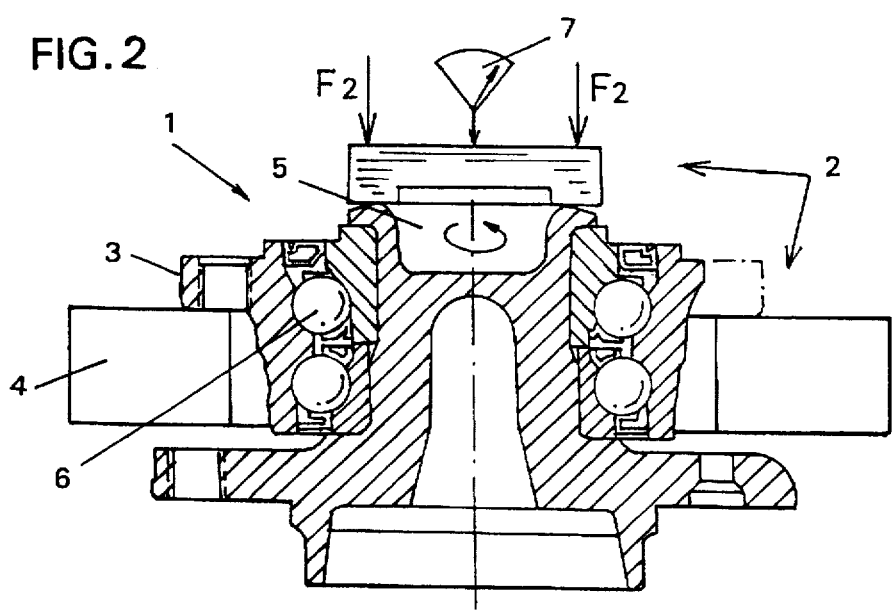
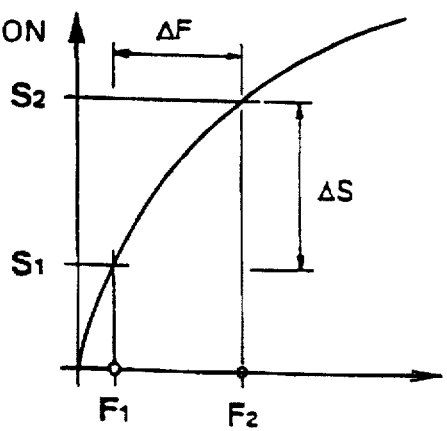
FIG. 3

| AXIAL CLEARANCE /mμm/ | 0 | -10 | -20 | -30 | -40 | -50 | -70 | -90 |
|---|---|---|---|---|---|---|---|---|
| ELASTIC DEFORMATION /mμm/ | 57 | 52 | 47 | 42 | 37 | 32 | 24 | 20 |
| PRESTRESS FORCE /KN/ | 0 | | 2 | 4 | 7 | 11 | 16 | 28 | 42 |

PROCESS FOR DETERMINING THE INITIAL STRESS OF ANTIFRICTION BEARINGS WHICH ARE PRELOADED AGAINST EACH OTHER OR INSTALLED WITH AN INITIAL STRESS

BACKGROUND OF THE INVENTION

The present invention concerns a process for determining the initial stress of antifriction bearings which are preloaded against each other or installed with an initial stress.

Antifriction bearings, in particular wheel bearings of motor vehicles, are preloaded against each other in order to take up lateral forces, for instance upon travel around curves. In this connection, there is the problem that, due for instance to manufacturing tolerances, the prestressing force cannot be precisely determined or, in the case of plastically deformed wheel bearings (see Federal Republic of Germany 43 39 847 C1), there is a lack of clarity as to the initial stress which is actually present.

It has therefore been attempted to determine the initial stress by measuring the prestressing deformation in an experimental setup similar to the final installation arrangement in the case of prestressed antifriction bearings (see Federal Republic of Germany 15 25 257 B2). This method is, however, cumbersome and does not take the tolerances and temperature differences of the bearing in the installed parts sufficiently into account. This is true also of a process for the prestressing of an angular antifriction bearing in accordance with Federal Republic of Germany 33 04 358 C2 in which the prestressing deformation, also determined on a reference part, is determined and adjusted for instance by ultrasonic measurement. It is also known to estimate the prestressing force by a comparison of the moment of friction of the antifriction bearing (Federal Republic of Germany 15 25 256 B2).

All the known processes and methods have the disadvantage that they do not permit a direct determination as to the initial stress of the antifriction bearing which is actually present, so that uncertainties or inaccuracies always remain.

SUMMARY OF THE INVENTION

It is therefore an important object of the present invention to provide a method of determining the prestressing force of preloaded antifriction bearings which make it possible, by simple means, to make a reliable determination of the initial stress which is actually present in the bearing. In this connection it should also be possible to determine the initial stress actually present in antifriction bearings which have already been assembled in a non-detachable manner (even after a lengthy period of use).

These and other objects are achieved by the method steps disclosed and claimed herein.

The invention makes use of the observation that the antifriction bearing, depending on the design of the bearing and the surrounding place, has a non-linear elastic behavior and a specific elastic stiffness. The elastic action of antifriction bearings is described in detail in the book "Die Wälzlagerpraxis" (Antifriction Bearings) by Eschmann Hasbargen Weigand, 1978, published by R. Odlenbourg, pages 130 et seq.

By the application of a specific test load to the already prestressed bearing and measurement of the elastic deformation which results therefrom, the corresponding elastic characteristic of the bearing can be readily determined and the prestress which had already been present can be easily read off. For use in the shop, a conversion table corresponding to a given bearing can be drawn up for simplified reading, from which table the corresponding prestress values can then be read. Since there is a direct relationship between the loading deformation and the loading force, it is readily possible, depending on the specific use or the desire of the customer, to indicate or convert the preloading in deformation distance or force units (μm or N). Of course, the test force plus the actual prestress force must not exceed the limits of the plastic deformation of the bearing.

It is also advisable, before applying the test force, to apply a slight preload on the bearing so as to create well-defined starting conditions for the measurement of the deformation.

BRIEF DESCRIPTION OF THE DRAWINGS

The above and other objects, features and advantages of the invention will be explained in detail in connection with an example thereof, with reference to the accompanying drawings, in which:

FIG. 1 diagrammatically shows a wheel bearing in a corresponding measuring device at the start of the measuring process (pre-load);

FIG. 2 diagrammatically shows a wheel bearing in a corresponding measuring device at the end of the measuring process;

FIG. 3 is a deformation/prestress graph with a specific test load of ΔF (for instance 20 kN);

DETAILED DESCRIPTION

Figure 4:
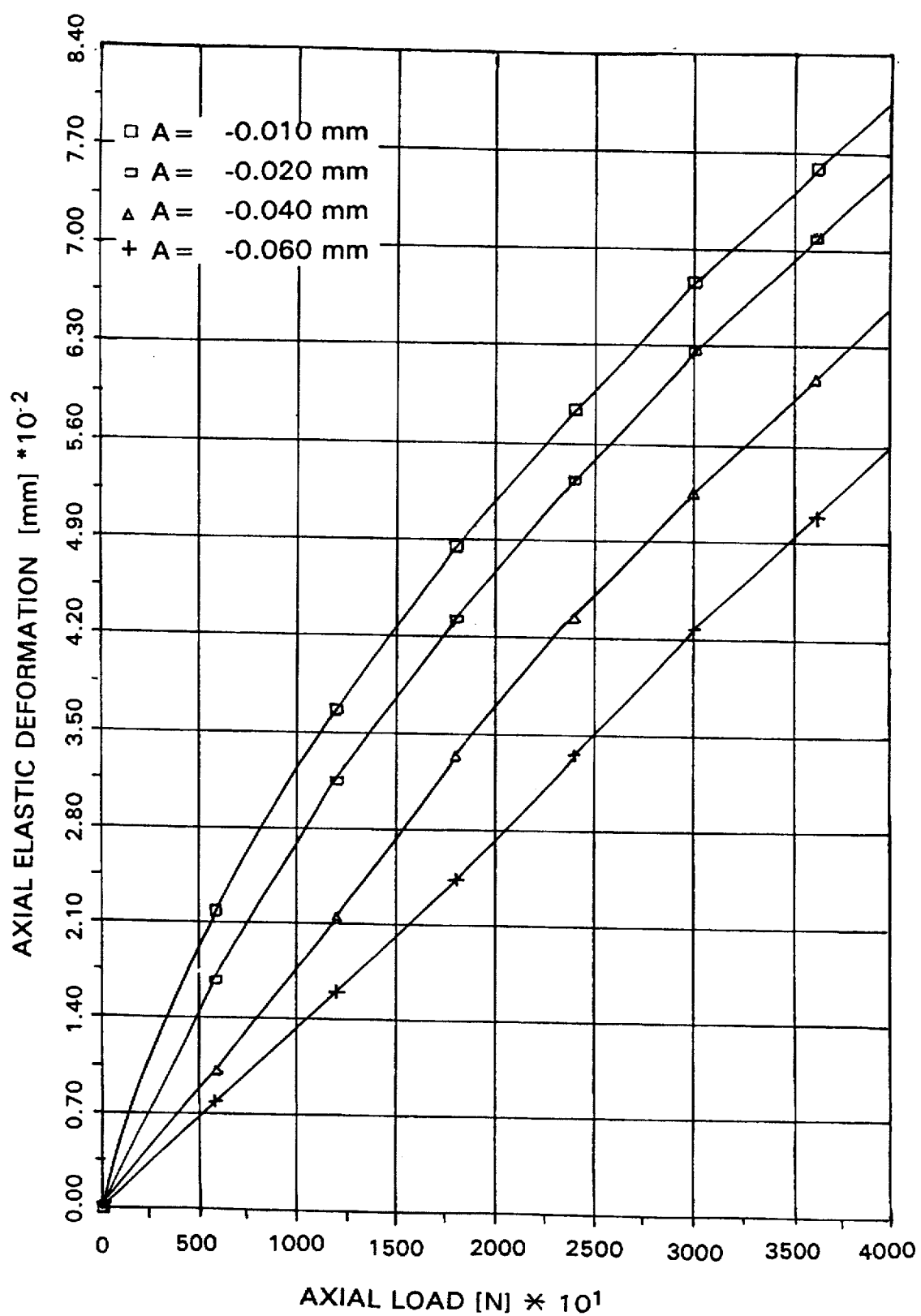
FIG. 4 is an elastic deformation/axial-load graph.

As can be noted from FIGS. 1 and 2, the wheel bearing 1 which is to be tested lies on a measuring device 2 which is placed in slight rotation. The wheel bearing 1 rests with its front flange 3 on a base plate 4 of the measuring device 2. Via the hub 5, the preload $F_1$ is applied to the bearing so that the load is transmitted via the upper row of rolling bodies 6. The position (spacing) is determined by a dial gauge 7. The test load $F_2$ is now applied and the elastic deformation is read off on the measurement dial 7. The elastic constant of this bearing (ΔS over ΔF) can thus be determined (FIG. 3 and FIG. 4). In this way, one can directly conclude what the initial stress present in the bearing is.

Figures 5, 6:
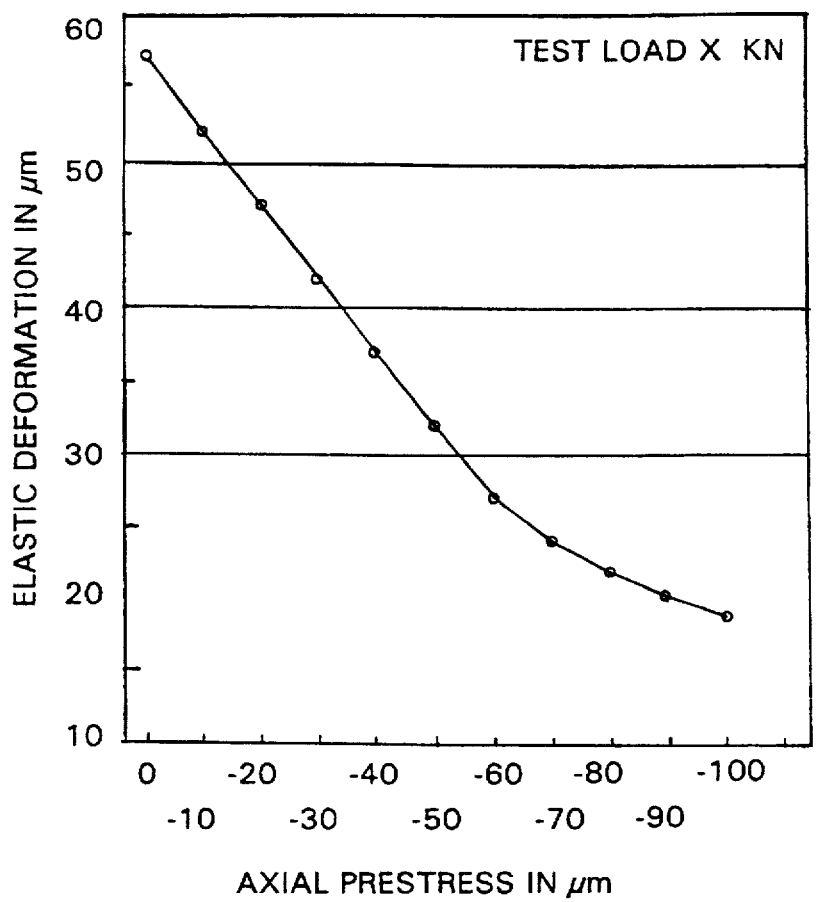
FIG. 5 is a conversion curve for a special bearing with corresponding elastic-deformation/prestress values.
FIG. 6 is a conversion table of prestress-deformation/ elastic-deformation/prestress force.

If the measurement, for instance, gives a value of ΔS=47 μm, then this corresponds, in the case of a given bearing row (FIGS. 5 and 6), to an initial stress (negative bearing clearance) of 20 μm or a prestressing force of 4 kN. These values can be made available as desired for each bearing and in accordance with the wish of the customer.

Although the present invention has been described in relation to particular embodiments thereof, many other variations and modifications and other uses will become apparent to those skilled in the art. Therefore, the present invention is not limited by the specific disclosure herein.

What is claimed is:

1. A process for determining an initial stress of antifriction bearings which are preloaded against each other or installed with an initial stress, comprising the steps of:

determining said initial stress as a function of the elastic behavior (elastic deformation) of the bearing, by applying a first force $F_1$ to the bearing as it rests on a support, and measuring the elastic deformation $S_1$ resulting therefrom;

applying a second, higher force $F_2$ to the bearing and measuring the elastic deformation $S_2$ resulting therefrom; and determining the difference between said elastic deformations ($S_2-S_1=S$) and based on said difference, finding said initial stress by comparison of said difference with a predetermined elastic characteristic of the bearing.

2. A process according to claim 1, further comprising the step of rotating the bearing during the applying and measuring steps.

3. A process according to claim 2, wherein the force is applied axially along the axis of the bearing, the value of the second force $F_2$ being derived by calculation from the design data, with due consideration of the maximum permissible surface pressure.

4. A process according to claim 1, wherein said initial stress of the bearing is expressed as a deformation distance.

5. A process according to claim 1, wherein said initial stress of the bearing is expressed as a force.

6. A process according to claim 1, wherein said bearings are motor vehicle wheel bearings which are connected inseparably into a structural unit.

7. A process according to claim 1, further comprising the step of predetermining said elastic characteristic of the bearing by calculation.

8. A process according to claim 1, further comprising the step of predetermining said elastic characteristic of the bearing empirically.

* * * * *